United States Patent
Ito

(10) Patent No.: US 11,313,941 B2
(45) Date of Patent: Apr. 26, 2022

(54) COMMUNICATION DEVICE AND CONTROL METHOD

(71) Applicant: Mitsubishi Electric Corporation, Tokyo (JP)

(72) Inventor: Naosuke Ito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 34 days.

(21) Appl. No.: 16/638,095

(22) PCT Filed: Oct. 23, 2017

(86) PCT No.: PCT/JP2017/038151
§ 371 (c)(1),
(2) Date: Feb. 10, 2020

(87) PCT Pub. No.: WO2019/082236
PCT Pub. Date: May 2, 2019

(65) Prior Publication Data
US 2021/0255274 A1 Aug. 19, 2021

(51) Int. Cl.
*G01S 3/02* (2006.01)
*G01S 5/02* (2010.01)
(Continued)

(52) U.S. Cl.
CPC .............. *G01S 5/0284* (2013.01); *G01S 3/46* (2013.01); *G01S 3/023* (2013.01); *G01S 5/0027* (2013.01); *G01S 5/04* (2013.01); *G01S 19/42* (2013.01)

(58) Field of Classification Search
CPC .... G01S 5/0284; G01S 5/0027; G01S 5/0268; G01S 5/04; G01S 5/06; G01S 3/023; G01S 3/46
(Continued)

(56) References Cited

U.S. PATENT DOCUMENTS 4,797,679 A * 1/1989 Cusdin ................... G04F 10/00
968/844
5,334,984 A * 8/1994 Akaba ...................... G01S 3/10
342/148
(Continued)

FOREIGN PATENT DOCUMENTS

JP 2002-214316 A 7/2002
JP 2010-102455 A 5/2010
(Continued)

OTHER PUBLICATIONS

"700MHz Band Intelligent Transportation System Experimental Vehicle-to-Vehicle Communication Message Guidelines ITS Forum RC-013", ITS Info-communications Forum, pp. 16. 48-49. drawn up on Mar. 31, 2014.
(Continued)

*Primary Examiner* — Chuong P Nguyen
(74) *Attorney, Agent, or Firm* — Birch, Stewart, Kolasch & Birch, LLP

(57) ABSTRACT

A communication device includes: an acquisition unit that acquires first position information indicating a first position of the communication device and first position error information indicating an error of the first position; a reception unit that receives second position information indicating a second position of a communication device and second position error information indicating an error of the second position acquired by the communication device; a first calculation unit that calculates a first arrival direction and a first arrival direction error based on one or more pieces of information out of the first position information and so on; a second calculation unit that calculates a second arrival direction; and a judgment unit that makes the second calculation unit revise the second arrival direction based on the
(Continued)

first arrival direction when the first arrival direction error is smaller than a first threshold value.

9 Claims, 9 Drawing Sheets

(51) Int. Cl.
    *G01S 3/46*         (2006.01)
    *G01S 5/00*         (2006.01)
    *G01S 19/42*       (2010.01)
    *G01S 5/04*         (2006.01)

(58) Field of Classification Search
    USPC .......................................................... 342/458
    See application file for complete search history.

(56) References Cited

U.S. PATENT DOCUMENTS

| | | | | |
|---|---|---|---|---|
| 6,373,435 | B2* | 4/2002 | Kurihara | G01S 3/36 |
| | | | | 342/362 |
| 6,459,409 | B1* | 10/2002 | Kohno | G01S 5/04 |
| | | | | 342/450 |
| 10,495,743 | B2* | 12/2019 | Kitamura | G01S 13/34 |
| 10,732,253 | B2* | 8/2020 | Smith | H01Q 21/065 |
| 2021/0025969 | A1* | 1/2021 | Ouchi | G01S 13/584 |
| 2021/0156947 | A1* | 5/2021 | Takizawa | G01S 3/043 |
| 2021/0270925 | A1* | 9/2021 | Dougherty | G01S 3/10 |

FOREIGN PATENT DOCUMENTS

| | | |
|---|---|---|
| JP | 2012-145374 A | 8/2012 |
| JP | 2013-185940 A | 9/2013 |
| JP | 2014-235044 A | 12/2014 |

OTHER PUBLICATIONS

International Search Report for PCT/JP2017/038151 (PCT/ISA/210) dated Dec. 5, 2017.

* cited by examiner

COMMUNICATION DEVICE AND CONTROL METHOD

TECHNICAL FIELD

The present invention relates to a communication device and a control method.

BACKGROUND ART

There has been proposed a method in which a communication device receiving a signal from a communication device as a transmission source analyzes the signal and calculates an arrival direction of the signal (i.e., a direction in which the transmission source exists). For example, an in-vehicle communication device described in Patent Reference 1 receives a radio signal transmitted from an in-vehicle communication device as a transmission source and adjusts a phase to a phase that maximizes output voltage. The in-vehicle communication device described in the Patent Reference 1 calculates the arrival direction of the in-vehicle communication device as the transmission source based on the phase that maximizes the output voltage.

PRIOR ART REFERENCE

Patent Reference

Patent Reference 1: Japanese Patent Application Publication No. 2010-102455

Non-Patent Reference

Non-patent Reference 1: ITS Info-communications Forum, "700 MHz Band Intelligent Transportation System Experimental Vehicle-to-Vehicle Communication Message Guidelines ITS FORUM RC-013", pages 16, 48-49, drawn up on Mar. 31, 2014

SUMMARY OF THE INVENTION

Problem to be Solved by the Invention

The arrival direction calculated by using the waveform of a signal is influenced by individual difference among a plurality of antennas, an installation error due to the installation of each of the plurality of antennas, temperature change, and so forth. Therefore, a user needs to periodically revise the influence (referred to also as calibration) by using a calibration device.

Further, when an infrastructure is adequately furnished, a communication device as a transmission source (hereinafter referred to as a "transmission device") is capable of acquiring position information on the transmission device with only a small error. A communication device capable of receiving a signal from the transmission device (hereinafter referred to as a "reception device") is also capable of acquiring position information on the reception device with only a small error. When the position information on the transmission device is acquired from the transmission device, the reception device is capable of calculating an arrival direction of high accuracy based on the position information on the transmission device and the position information on the reception device. The reception device is also capable of revising the arrival direction calculated by using the waveform of a signal to an arrival direction of high accuracy. However, constructing a well-furnished infrastructure increases the cost.

An object of the present invention is to make the revision to an arrival direction of high accuracy while inhibiting the cost rise.

Means for Solving the Problem

A communication device according to an aspect of the present invention is provided. A communication device that receives a signal provided from a positioning system and communicates with a first communication device includes: an acquisition unit that acquires first position information indicating a first position of the communication device and first position error information indicating an error of the first position based on a signal provided from the positioning system; a reception unit that receives second position information indicating a second position of the first communication device and second position error information indicating an error of the second position acquired by the first communication device based on a signal provided from the positioning system; a first calculation unit that calculates a first arrival direction as a direction toward the first communication device from the communication device and a first arrival direction error indicating an error of the first arrival direction based on one or more pieces of information out of the first position information, the first position error information, the second position information and the second position error information; a second calculation unit that calculates a second arrival direction as a direction toward the first communication device from the communication device based on a signal transmitted from the first communication device and sets a reliance degree of the second arrival direction based on condition of a transmission path between the communication device and the first communication device; and a judgment unit that makes the second calculation unit revise the second arrival direction based on the first arrival direction when the first arrival direction error is smaller than a predetermined first threshold value and the reliance degree is higher than a predetermined second threshold value.

Effect of the Invention

According to the present invention, it is possible to make a revision to an arrival direction of high accuracy while inhibiting the cost rise.

MODE FOR CARRYING OUT THE INVENTION

Embodiments will be described below with reference to drawings. The following embodiments are just examples and a variety of modifications are possible within the scope of the present invention.

First Embodiment

Figure 1:
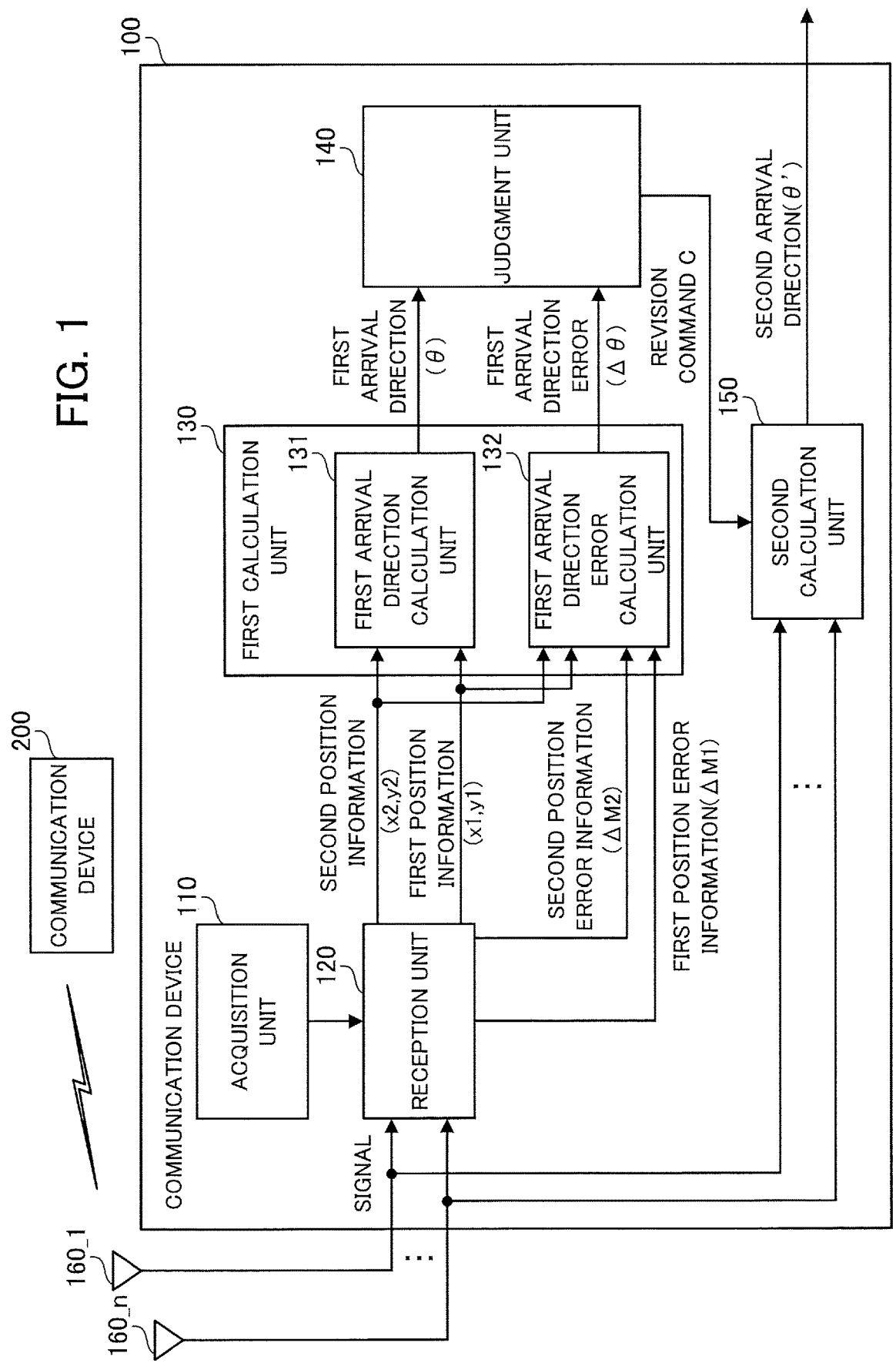
FIG. 1 is a functional block diagram showing a configuration of a communication device in a first embodiment.

FIG. 1 is a functional block diagram showing a configuration of a communication device in a first embodiment. The communication device 100 includes an acquisition unit 110, a reception unit 120, a first calculation unit 130, a judgment unit 140, a second calculation unit 150 and antenna elements 160_1 to 160_n (n: positive integer). The first calculation unit 130 includes a first arrival direction calculation unit 131 and a first arrival direction error calculation unit 132.

The communication device 100 is capable of performing wireless communication with a communication device 200 that is a device as a party of communication. For example, the communication device 100 is installed in a first vehicle. The communication device 200 is installed in a second vehicle. The communication device 100 and the communication device 200 communicate with each other. By using a signal transmitted by the communication device 200, the communication device 100 calculates an arrival direction of the signal. Incidentally, the communication device 200 is referred to also as a first communication device. The communication device 100 and the communication device 200 may also be provided on transportation means other than vehicles. As for the device as the party of wireless communication with the communication device 100, there may be a plurality of communication devices existing at different positions.

The signal transmitted by the communication device 200 includes position information indicating the position of the communication device 200 and position error information indicating error of the position indicated by the position information. Details of the position information and the position error information will be described later. Further, the communication device 100 is capable of transmitting a signal, including position information indicating the position of the communication device 100 and position error information indicating error of the position indicated by the position information, to the communication device 200. In short, the communication device 100 and the communication device 200 are capable of communicating the position information and the position error information with each other. The position information and the position error information are acquired based on a radio signal provided from a positioning system, for example. The communication device 100 and the communication device 200 receive a signal provided from the positioning system. The positioning system will be described in detail later.

Next, the hardware configuration of the communication device 100 will be described.

Figure 2:
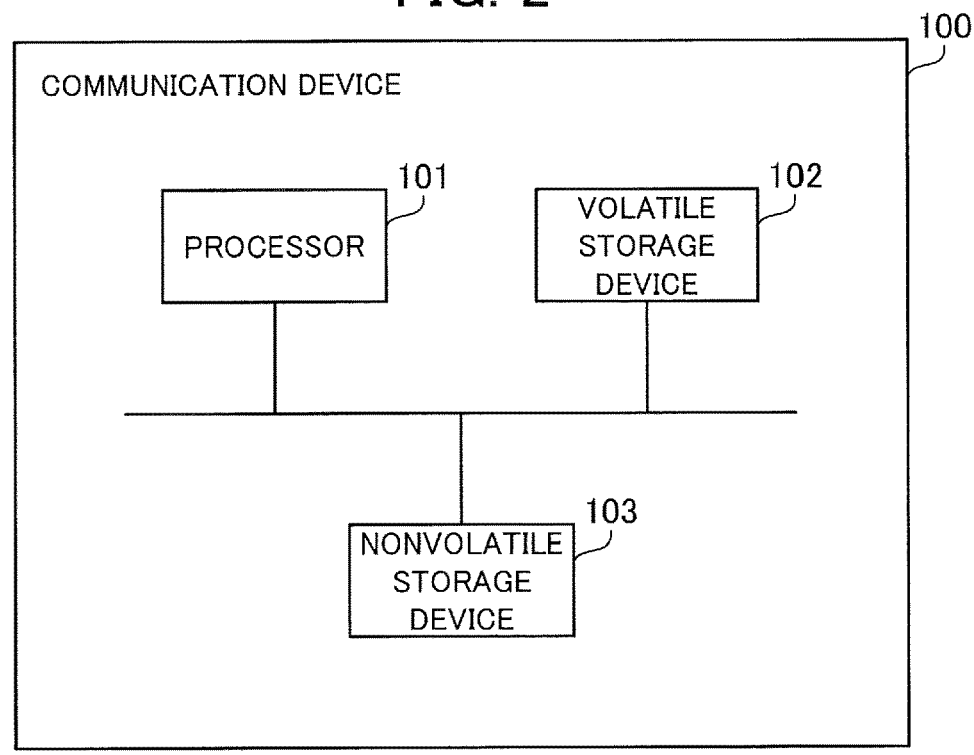
FIG. 2 is a diagram showing a main hardware configuration of the communication device.

FIG. 2 is a diagram showing the main hardware configuration of the communication device. The communication device 100 includes a processor 101, a volatile storage device 102 and a nonvolatile storage device 103.

The processor 101 controls the whole of the communication device 100. For example, the processor 101 is a Central Processing Unit (CPU), a Field Programmable Gate Array (FPGA), or the like. The communication device 100 may also be implemented by a processing circuit, software, firmware, or a combination of some of them.

The volatile storage device 102 is a main storage device of the communication device 100. For example, the volatile storage device 102 is a Random Access Memory (RAM). The nonvolatile storage device 103 is an auxiliary storage device of the communication device 100. For example, the nonvolatile storage device 103 is a Hard Disk Drive (HDD), a Solid State Drive (SSD), or the like.

Incidentally, the communication device 200 has a hardware configuration similar to that of the communication device 100.

The reception unit 120, the first calculation unit 130, the first arrival direction calculation unit 131, the first arrival direction error calculation unit 132, the judgment unit 140 and the second calculation unit 150 may be implemented by the processor 101. In this case, the processor 101 may be a multiprocessor that executes a plurality of processes in parallel. It is also possible to implement the reception unit 120, the first calculation unit 130, the first arrival direction calculation unit 131, the first arrival direction error calculation unit 132, the judgment unit 140 and the second calculation unit 150 as a module of a program executed by the processor 101, for example. The program is stored in the volatile storage device 102 or the nonvolatile storage device 103.

With reference to FIG. 1 again, the functional blocks will be described below.

The acquisition unit 110 acquires first position information (e.g., coordinates (x1, y1)) and first position error information (e.g., value $\Delta M1$) based on a signal provided from the positioning system. For example, the positioning system is a Global Navigation Satellite System (GNSS), a sensor for detecting the position, or the like. For example, the acquisition unit 110 is a device that receives a signal provided from the GNSS or sensor.

The first position information (x1, y1) indicates a first position of the communication device 100. There are cases where the first position is not the correct position of the communication device 100. The first position error information (value $\Delta M1$) indicates the error of the first position. The first position error information (value $\Delta M1$) can be regarded as information indicating the error between the correct position of the communication device 100 and the first position. For example, the first position error information (value $\Delta M1$) is a position information error ellipse semimajor axis, a position information error ellipse semiminor axis, a position information error ellipse rotation angle, or the like. For example, the first position error information (value $\Delta M1$) can be determined from GNSS pseudorange error statistics (GST) included in a signal acquired by the acquisition unit 110.

The precision of the first position error information (value $\Delta M1$) may be calculated from one or more of various types of information such as the number of detected satellites, arrangement of the detected satellites, and whether a Differential Global Positioning System (DGPS) is used or not. The error of the first position decreases with the increase in the number of detected satellites. Further, Dilution Of Precision (DOP) calculated from the arrangement of the detected satellites is known as an index of the precision of the first position error information (value $\Delta M1$). Furthermore, first position error information (value $\Delta M1$) of high precision can be calculated based on a database indicating the result of an experiment considering one or more of various types of conditions such as weather and shapes of surrounding structures.

The acquisition unit 110 may acquire the first position and the first position error information (value ΔM1) via the antenna elements 160_1 to 160_n.

The reception unit 120 acquires the first position information (x1, y1) and the first position error information (value ΔM1) from the acquisition unit 110.

The reception unit 120 receives second position information (e.g., coordinates (x2, y2)) indicating a second position of the communication device 200 acquired by the communication device 200 based on a signal provided from the positioning system. Incidentally, there are cases where the second position is not the correct position of the communication device 200. The reception unit 120 receives second position error information (e.g., value ΔM2) indicating the error of the second position acquired by the communication device 200 based on a signal provided from the positioning system. The second position error information (value ΔM2) can be regarded as information indicating the error between the correct position of the communication device 200 and the second position.

A process until the reception unit 120 receives the second position information (x2, y2) and the second position error information (value ΔM2) will be described in detail below. The communication device 200 acquires the second position information (x2, y2) and the second position error information (value ΔM2) based on a signal provided from the GNSS or sensor. The communication device 200 transmits a signal including the second position information (x2, y2) and the second position error information (value ΔM2) to the communication device 100. Namely, the second position information (x2, y2) and the second position error information (value ΔM2) are transmitted from the communication device 200 as communication data. The reception unit 120 receives the signal transmitted by the communication device 200 via the antenna elements 160_1 to 160_n. The reception unit 120 demodulates the received signal. The reception unit 120 acquires the second position information (x2, y2) and the second position error information (value ΔM2) included in the signal by demodulating the signal.

Here, the second position error information is "DE_position information error ellipse semimajor axis", "DE_position information error ellipse semiminor axis" or "DE_position information error ellipse rotation angle", for example. DE stands for a data element, as the minimum unit of data constituting a message. The "DE_position information error ellipse semimajor axis", "DE_position information error ellipse semiminor axis" or "DE_position information error ellipse rotation angle" is described in "ITS Info-communications Forum, "700 MHz Band Intelligent Transportation System Experimental Vehicle-to-Vehicle Communication Message Guidelines ITS FORUM RC-013", pages 16, 48-49, drawn up on Mar. 31, 2014". For example, the reception unit 120 receives the "DE_position information error ellipse semimajor axis", "DE_position information error ellipse semiminor axis" or "DE_position information error ellipse rotation angle" as the second position error information (value ΔM2).

The first calculation unit 130 calculates a first arrival direction (i.e., an angle θ corresponding to the first arrival direction) and a first arrival direction error (i.e., an angle Δθ corresponding to the first arrival direction error) based on one or more or all pieces of information out of the first position information (x1, y1), the first position error information (value ΔM1), the second position information (x2, y2) and the second position error information (value ΔM2). Details of the first arrival direction (angle θ) will be described later. The first arrival direction error (angle Δθ) indicates the error of the first arrival direction (angle θ).

A process executed by the first calculation unit 130 will be described below by using the first arrival direction calculation unit 131 and the first arrival direction error calculation unit 132.

The first arrival direction calculation unit 131 calculates the arrival direction of a signal based on the first position information (x1, y1) acquired by the acquisition unit 110 and the second position information (x2, y2) acquired by the reception unit 120. Further, the first arrival direction calculation unit 131 is capable of determining the first position in representation using the latitude and longitude. The first arrival direction calculation unit 131 is capable of determining the second position in representation using the latitude and longitude.

The arrival direction calculated by the first arrival direction calculation unit 131 is defined as the first arrival direction (angle θ). Namely, the first arrival direction (angle θ) is a direction toward the communication device 200 from the communication device 100. Further, an arrival direction calculated by the second calculation unit 150 which will be explained later is defined as a second arrival direction (angle θ'). The first arrival direction (angle θ) is calculated with reference to the direction of the communication device 100. For example, the direction of the communication device 100 means a direction that the front of the communication device 100 is facing. In cases of vehicle-to-vehicle communication, the direction of the communication device 100 can be regarded as the direction of the vehicle (i.e., traveling direction of the vehicle).

Figure 3:
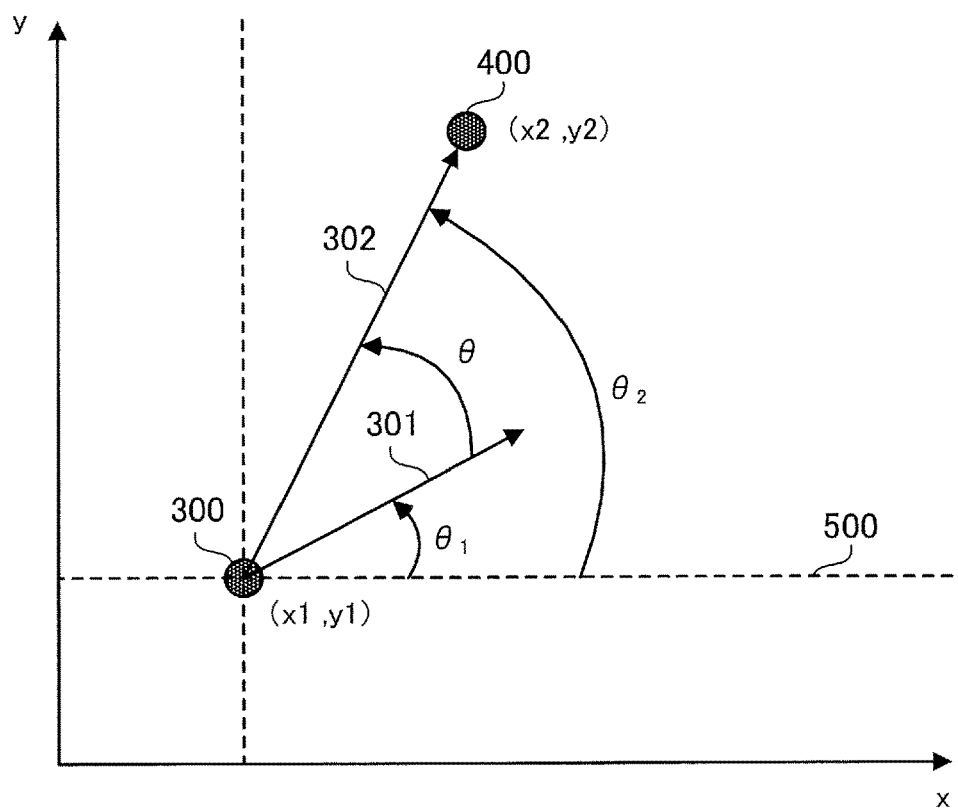
FIG. 3 is a diagram for explaining a method of calculating a first arrival direction.

FIG. 3 is a diagram for explaining a method of calculating the first arrival direction (angle θ). The horizontal axis is an x-axis. The vertical axis is a y-axis. The position 300 represents the first position. The coordinates of the position 300 are (x1, y1) corresponding to the first position information. The position 400 represents the second position. The coordinates of the position 400 are (x2, y2) corresponding to the second position information. For example, it is possible to make x1 correspond to the longitude of the first position and make y1 correspond to the latitude of the first position. It is possible to make x2 correspond to the longitude of the second position and make y2 correspond to the latitude of the second position.

An arrow 301 indicates the direction of the communication device 100. An arrow 302 indicates the first arrival direction (angle θ). $θ_1$ indicates the angle between the arrow 301 and a straight line 500. $θ_2$ indicates the angle between the arrow 302 and the straight line 500. θ indicates the angle between the direction of the communication device 100 (arrow 301) and the first arrival direction (arrow 302). The first arrival direction calculation unit 131 first calculates the angle $θ_2$ by using the following expression (1):

$$θ_2 = \tan^{-1}\frac{y2 - y1}{x2 - x1} \tag{1}$$

Subsequently, the first arrival direction calculation unit 131 calculates the first arrival direction (angle θ) by using the following expression (2):

$$θ = θ_2 - θ_1 \tag{2}$$

The first arrival direction calculation unit 131 determines the first arrival direction (arrow 302 in FIG. 3) as the direction of the angle θ with reference to the direction of the communication device 100. The first arrival direction calculation unit 131 calculates the first arrival direction (angle θ) as above.

Incidentally, the direction of the communication device 100 can be determined by using an orientation sensor or the like. In cases where the communication device 100 is installed in a vehicle, the direction of the communication device 100 can be calculated from the traveling direction of the vehicle and the mounting angle of wireless equipment installed in the vehicle.

The first arrival direction error calculation unit 132 calculates the first arrival direction error (angle Δθ) by using the first position information (x1, y1) and the first position error information (value ΔM1) acquired by the acquisition unit 110 and the second position information (x2, y2) and the second position error information (value ΔM2) acquired by the reception unit 120.

Figure 4:
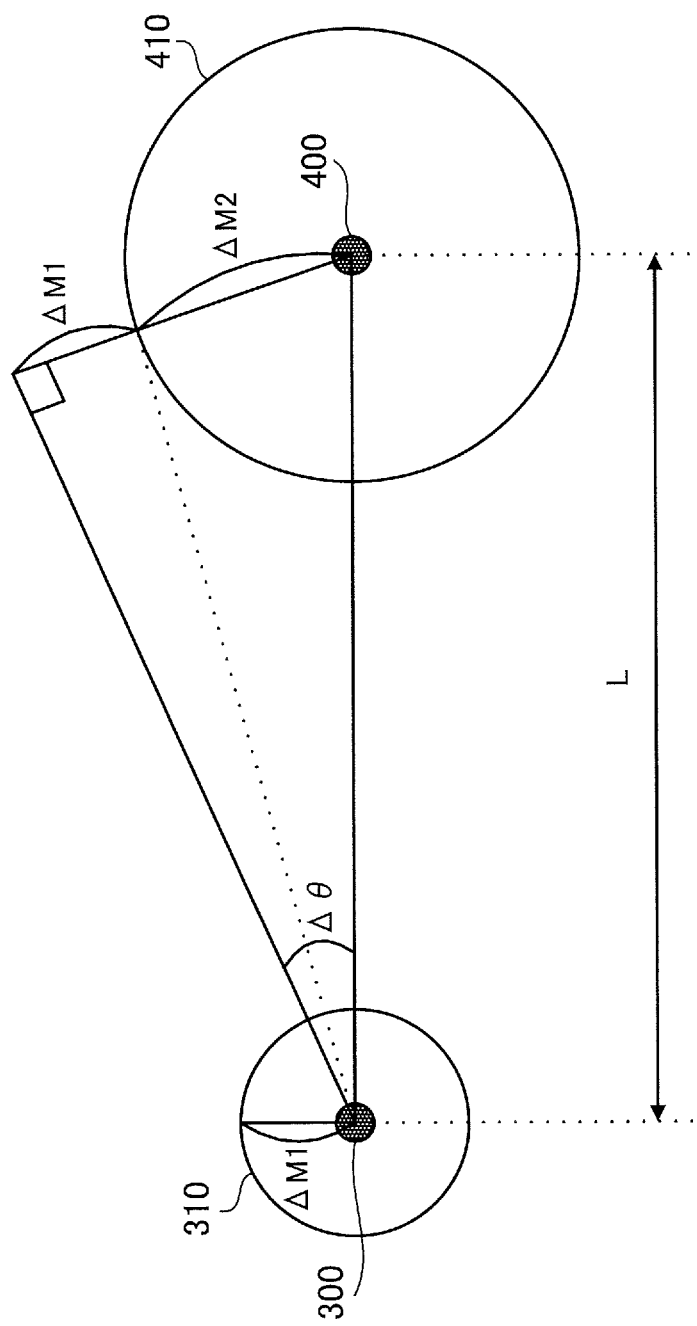
FIG. 4 is a diagram for explaining a method of calculating a first arrival direction error.

FIG. 4 is a diagram for explaining a method of calculating the first arrival direction error (angle Δθ). The position 300 represents the first position. The position 400 represents the second position.

L is the distance between the position 300 and the position 400. ΔM1 is the value represented by the first position error information. ΔM2 is the value represented by the second position error information. The circle 310 is approximation of an error range having a radius of ΔM1 by use of a circle. The circle 410 is approximation of an error range having a radius of ΔM2 by use of a circle. Δθ is the angle representing the first arrival direction error. The first arrival direction error calculation unit 132 calculates the first arrival direction error (angle Δθ) by using the following expression (3):

$$\Delta\theta = \sin^{-1}\left(\frac{\Delta M1 + \Delta M2}{L}\right) \quad (3)$$

The expression (3) indicates that the first arrival direction error (angle Δθ) decreases with the decrease in the total value of the first position error information (value ΔM1) and the second position error information (value ΔM2). Further, the expression (3) indicates that the first arrival direction error (angle Δθ) decreases with the increase in the distance L between the first position 300 and the second position 400.

It is also possible for the first arrival direction error calculation unit 132 to calculate the first arrival direction error (angle Δθ) by using position error information as either of the first position error information (value ΔM1) or the second position error information (value ΔM2), the first position information (x1, y1), and the second position information (x2, y2).

With reference to FIG. 1 again, the judgment unit 140 and the second calculation unit 150 will be described below.

When the first arrival direction error (angle Δθ) is smaller than a first threshold value TH1, the judgment unit 140 makes the second calculation unit 150 revise the second arrival direction (angle θ') calculated by the second calculation unit 150 based on the first arrival direction (angle θ). Specifically, when the first arrival direction error (angle Δθ) is smaller than the first threshold value TH1, the judgment unit 140 transmits a revision command C to the second calculation unit 150 so as to make the second arrival direction (angle θ') coincide with the first arrival direction (angle θ). When the first arrival direction error (angle Δθ) is smaller than the first threshold value TH1, it is also possible for the judgment unit 140 to transmit a revision command C to the second calculation unit 150 so as to bring the second arrival direction (angle θ') close to the first arrival direction (angle θ).

The first threshold value TH1 is a predetermined value. The first threshold value TH1 is stored in the volatile storage device 102 or the nonvolatile storage device 103.

Here, the first threshold value TH1 may be set to be at the same level or lower than a design-based maximum permissible value of a second arrival direction error (angle Δθ') as the error of the second arrival direction (angle θ') calculated by the second calculation unit 150. Further, it is desirable to revise the second arrival direction error (angle Δθ') when the first arrival direction error (angle Δθ) is smaller than the first threshold value TH1 and the second arrival direction error (angle Δθ') is smaller than a predetermined threshold value. The predetermined threshold value of the second arrival direction error (angle Δθ') may be previously determined in consideration of a permissible range based on the usage of the arrival direction.

An additional condition that the difference between the first arrival direction (angle θ) and the second arrival direction (angle θ') exceeds a predetermined threshold value may be employed and the judgment unit 140 may have the second arrival direction (angle θ') revised to coincide with the first arrival direction (angle θ). Here, as the predetermined threshold value, the sum of the value of the first arrival direction error (angle Δθ) and the value of the second arrival direction error (angle Δθ') may be used, for example.

Here, since the second arrival direction error (angle Δθ') is dependent on the transmission path and noise, the second arrival direction error (angle Δθ') may be calculated when the first arrival direction calculation unit 131 calculates the first arrival direction (angle θ). For example, the second arrival direction error (angle Δθ') can be calculated by measuring the signal-to-noise ratio.

For example, in cases of line-of-sight communication where the sight is unobstructed, the error of the GNSS and the error of the second arrival direction (angle θ') calculated by the second calculation unit 150 are also small. Incidentally, the second arrival direction (angle θ') deviates from the true value due to a standard offset caused by incorrect calibration and an error corresponding to variations in measurement result. In the following description, the error of the second arrival direction (angle θ') is assumed to be the variations in measurement result while neglecting the standard offset. Thus, there are cases where the error of the second arrival direction (angle θ') is small even when the calibration is incorrect and the result of the calculation greatly differs from the true arrival angle.

The revision according to the first embodiment is made in such a situation of line-of-sight communication where the sight is unobstructed. Thereafter, when the error due to the GNSS increases due to obstruction by a building or the like, the direction of the communication device 200 can be estimated by using the already-revised second arrival direction (angle θ').

The first threshold value TH1 may be determined in consideration of the standard variations due to the influence of the individual difference among a plurality of antennas, the installation error due to the installation of each of the plurality of antennas or the temperature change and the permissible range of the error of the second arrival direction (angle θ') calculated by the second calculation unit 150 including the error due to the calibration. Here, the first threshold value TH1 may be set at a small value. When the first threshold value TH1 is set at a small value, the communication device 100 can determine the first arrival direction (angle θ) calculated when the value ΔM1 of the first position error information and the value ΔM2 of the second position error information are small as an arrival direction of higher accuracy.

Here, a design value of the second arrival direction error (angle Δθ') may be determined by an application that calculates the arrival direction. For example, precision within approximately 0.57 degrees becomes necessary in order to obtain precision within 1 m at 100 m ahead by using the application.

The second calculation unit 150 calculates the second arrival direction (angle θ'), as a direction toward the communication device 200 from the communication device 100, based on a signal transmitted from the communication device 200. Specifically, the second calculation unit 150 calculates the second arrival direction (angle θ') based on a signal received via the antenna elements 160_1 to 160_n. For example, the second calculation unit 150 calculates the second arrival direction by using waveform information on the signal and a method such as Multiple Signal Classification (MUSIC) or Estimation of Signal Parameters via Rotational Invariance Techniques (ESPRIT).

When the revision command C is received, the second calculation unit 150 executes a revision process of changing the angle θ' representing the second arrival direction into the value of the angle θ representing the first arrival direction. For example, when the second calculation unit 150 receives the revision command C, the angle θ' in FIG. 1 is the angle θ representing the first arrival direction.

Next, a process executed by the communication device 100 will be described below with reference to a flowchart.

Figure 5:
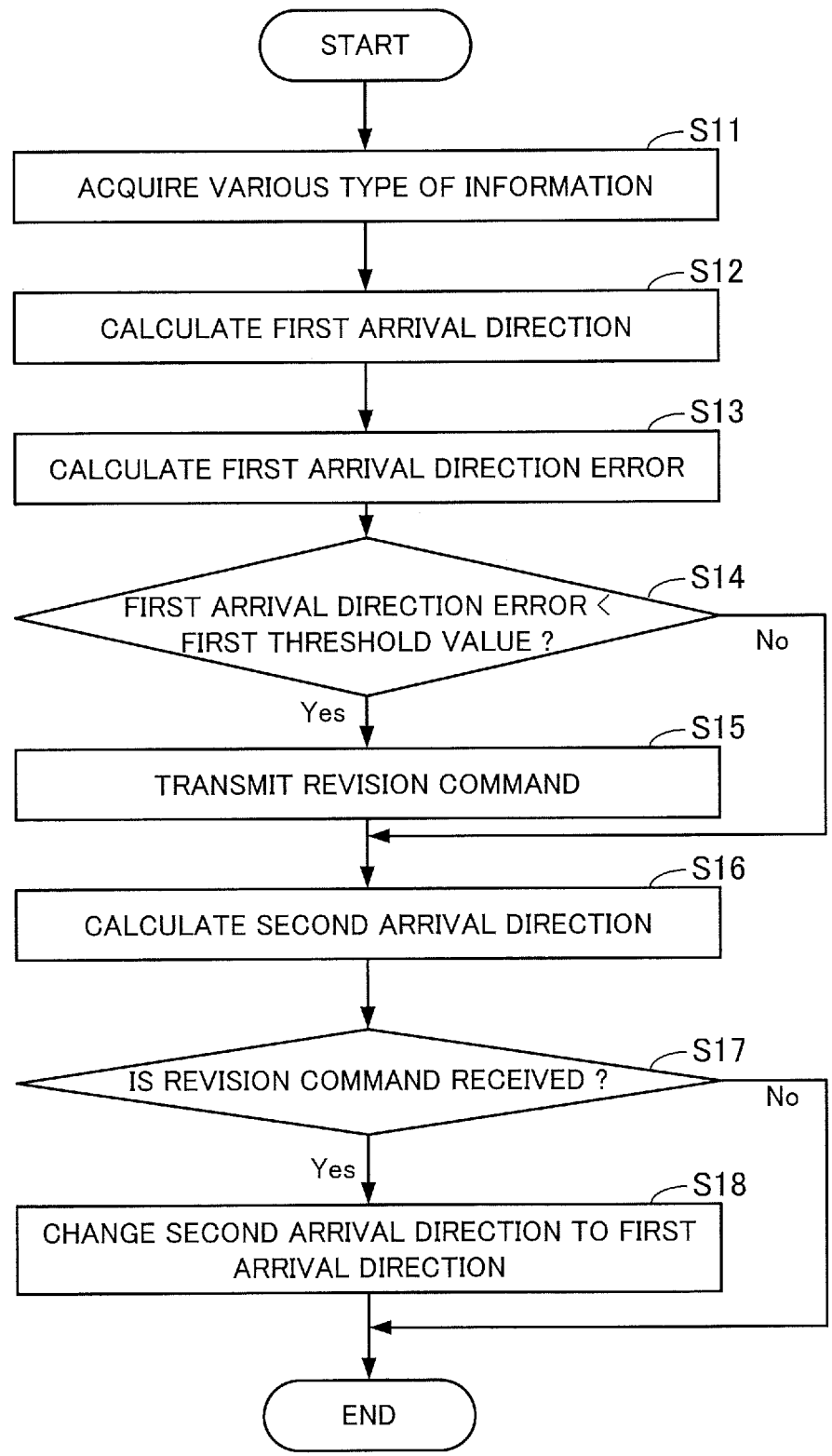
FIG. 5 is a flowchart showing a process executed by the communication device in the first embodiment.

FIG. 5 is a flowchart showing a process executed by the communication device in the first embodiment.

(Step S11) The reception unit 120 receives the first position information (x1, y1) and the first position error information (value ΔM1) from the acquisition unit 110. The reception unit 120 receives a signal transmitted by the communication device 200 via the antenna elements 160_1 to 160_n. The reception unit 120 demodulates the received signal. The reception unit 120 acquires the second position information (x2, y2) and the second position error information (value ΔM2) by demodulating the signal.

(Step S12) The first arrival direction calculation unit 131 calculates the angle $θ_2$ by using the expression (1). The first arrival direction calculation unit 131 calculates the angle θ representing the first arrival direction by using the expression (2).

The first arrival direction calculation unit 131 determines the first arrival direction as the direction of the angle θ with reference to the direction of the communication device 100. As above, the first arrival direction calculation unit 131 calculates the first arrival direction (angle θ) by using the expression (1) and the expression (2).

(Step S13) The first arrival direction error calculation unit 132 calculates the first arrival direction error (angle Δθ) by using the expression (3).

(Step S14) The judgment unit 140 judges whether or not the first arrival direction error (angle Δθ) is smaller than the first threshold value TH1. When the first arrival direction error (angle Δθ) is smaller than the first threshold value TH1 (Yes in the step S14), the judgment unit 140 judges that the first arrival direction (angle θ) is an arrival direction of high accuracy. The judgment unit 140 determines to revise the second arrival direction (angle θ') to the first arrival direction (angle θ). Then, the judgment unit 140 advances the process to step S15.

When the first arrival direction error (angle Δθ) is larger than or equal to the first threshold value TH1 (No in the step S14), the judgment unit 140 advances the process to step S16.

(Step S15) The judgment unit 140 transmits the revision command C to the second calculation unit 150 so as to make the second arrival direction (angle θ') coincide with the first arrival direction (angle θ).

(Step S16) The second calculation unit 150 calculates the second arrival direction (angle θ') based on a signal transmitted by the communication device 200.

(Step S17) The second calculation unit 150 judges whether or not the revision command C is received. When the revision command C is received (Yes in the step S17), the second calculation unit 150 advances the process to step S18.

When the revision command C is not received (No in the step S17), the second calculation unit 150 outputs the second arrival direction (angle θ'). Then, the second calculation unit 150 ends the process.

(Step S18) The second calculation unit 150 executes the revision process of changing the angle θ' representing the second arrival direction into the value of the angle θ representing the first arrival direction. Namely, the second calculation unit 150 executes the revision process of making the second arrival direction (angle θ') coincide with the first arrival direction (angle θ). The second calculation unit 150 outputs the second arrival direction (angle θ') after undergoing the change to coincide (after the revision). Then, the second calculation unit 150 ends the process.

When the first arrival direction (angle θ) is judged to be an arrival direction of high accuracy in the step S14, the judgment unit 140 may output the first arrival direction (angle θ) to a hardware device included in the communication device 100 or a device connectable to the communication device 100. The device connectable to the communication device 100 can be a device connectable to the communication device 100 via a network. When outputting the first arrival direction (angle θ), the judgment unit 140 commands the second calculation unit 150 not to calculate the second arrival direction (angle θ'). Accordingly, the processing load on the communication device 100 can be lightened since the communication device 100 is relieved of the need to execute the process of calculating the second arrival direction (angle θ').

When the first arrival direction (angle θ) is judged to be an arrival direction of high accuracy in the step S14, the judgment unit 140 may acquire the second arrival direction (angle θ') calculated by the second calculation unit 150 and make the second arrival direction (angle θ') coincide with the first arrival direction (angle θ). The judgment unit 140 may either output the second arrival direction (angle θ') after undergoing the change to coincide via the second calculation unit 150 or output the second arrival direction (angle θ') after undergoing the change to coincide not via the second calculation unit 150 to a hardware device included in the communication device 100 or a device connectable to the communication device 100.

When outputting the second arrival direction (angle θ'), the second calculation unit 150 may output the second arrival direction (angle θ') to a hardware device included in the communication device 100 or a device connectable to the communication device 100.

It is also possible for the second calculation unit 150 to calculate the second arrival direction (angle θ') before the first calculation unit 130 calculates the first arrival direction (angle θ) and the first arrival direction error (angle Δθ).

According to the first embodiment, the communication device 100 calculates the first arrival direction (angle θ) by using the first position information (x1, y1), the first position error information (value ΔM1), the second position information (x2, y2) and the second position error information (value ΔM2). When the first arrival direction (angle θ) is judged to be an arrival direction of high accuracy, the communication device 100 revises the second arrival direction (angle θ') based on the first arrival direction (angle θ). For example, the first arrival direction (angle θ) used for the revision is not under the influence of the individual difference among a plurality of antennas. Therefore, the user does not need to regularly revise the influence by using a calibration device.

Further, the communication device 100 includes the acquisition unit 110 (e.g., reception device of GNSS) and is capable of revising the second arrival direction (angle θ') to an arrival direction of high accuracy when the second position information (x2, y2) and the second position error information (value ΔM2) are received from the communication device 200. Thus, the communication device 100 is capable of revising the second arrival direction (angle θ') to an arrival direction of high accuracy at a low cost without construction of a well-furnished infrastructure.

As described above, according to the first embodiment, the communication device 100 is capable of revising the second arrival direction (angle θ') calculated by the second calculation unit 150 to an arrival direction of high accuracy at a low cost.

Second Embodiment

Next, a second embodiment will be described below. In the second embodiment, the description will be given mainly of differences from the first embodiment and items common to the first embodiment will be left out.

In the first embodiment, the judgment unit 140 judges whether the second arrival direction (angle θ') should be revised or not by using the first arrival direction error (angle Δθ). In the second embodiment, a judgment unit 140a judges whether the second arrival direction (angle θ') should be revised or not by using reliance degree of the second arrival direction (angle θ').

Figure 6:
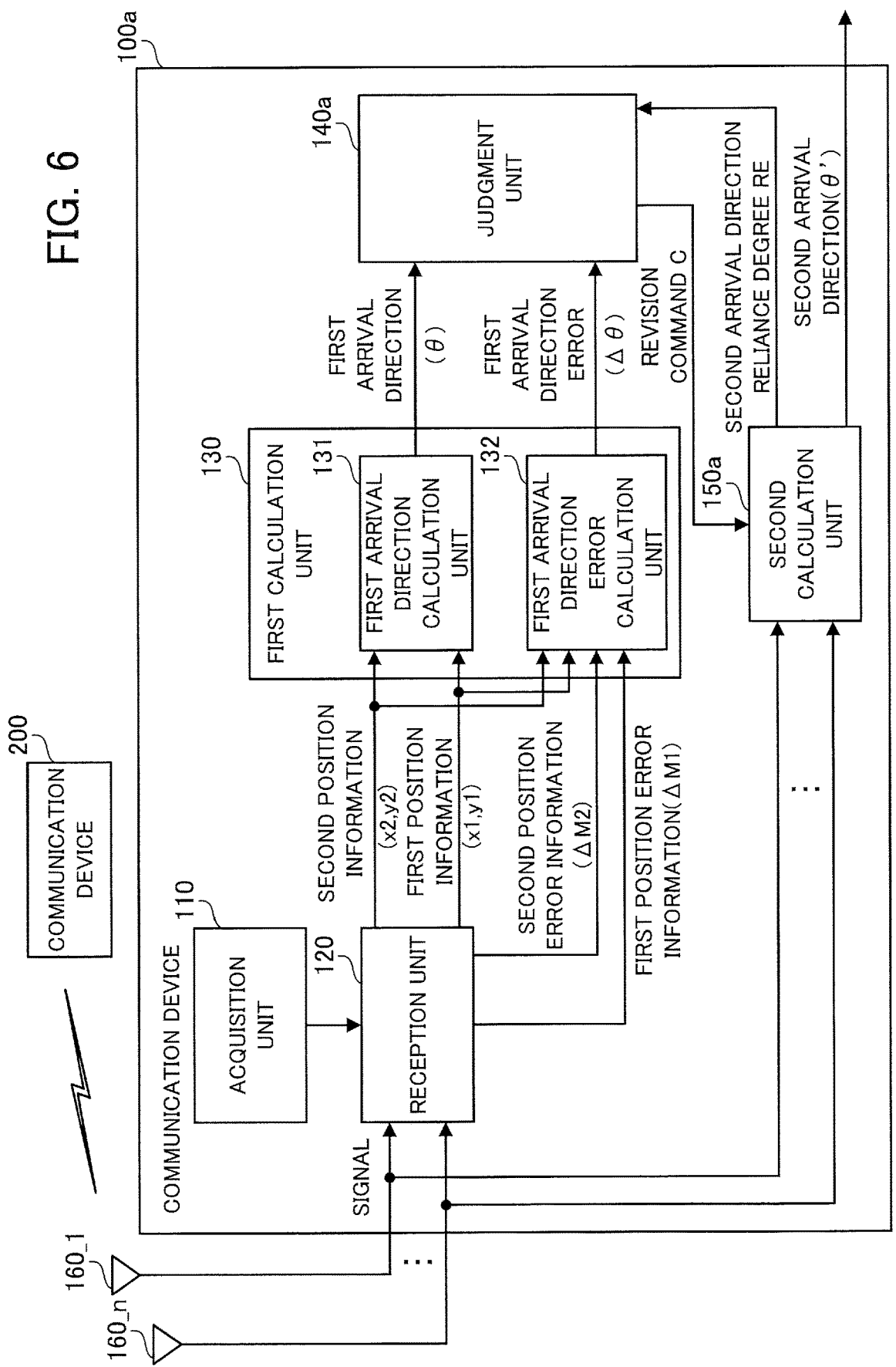
FIG. 6 is a functional block diagram showing a configuration of a communication device in a second embodiment.

FIG. 6 is a functional block diagram showing a configuration of a communication device in the second embodiment. The communication device 100a includes the judgment unit 140a and a second calculation unit 150a. The communication device 100a differs from the communication device 100 in functions of the judgment unit 140a and the second calculation unit 150a. Each component in FIG. 6 identical or corresponding to a component shown in FIG. 1 is assigned the same reference character as in FIG. 1. FIG. 1 to FIG. 5 will be referred to in the second embodiment.

The second calculation unit 150a calculates the second arrival direction (angle θ') and a second arrival direction reliance degree RE. The second arrival direction reliance degree RE indicates the reliance degree of the second arrival direction (angle θ'). The second calculation unit 150a sets the second arrival direction reliance degree RE based on condition of the transmission path between the communication device 100a and the communication device 200.

The second arrival direction reliance degree RE will be described in detail below. The second calculation unit 150a sets the second arrival direction reliance degree RE at a large value when the transmission path is a line-of-sight transmission path. Namely, the second calculation unit 150a sets the second arrival direction reliance degree RE at a large value when there exists no obstacle between the communication device 100a and the communication device 200 and the second arrival direction (angle θ') is calculated by using a signal directly received from the communication device 200.

The second calculation unit 150a sets the second arrival direction reliance degree RE at a small value when the transmission path is an over-the-horizon transmission path. Namely, the second calculation unit 150a sets the second arrival direction reliance degree RE at a small value when the signal cannot be received directly from the communication device 200, a signal reflected by a vicinal object is received, and the second arrival direction (angle θ') is calculated by using the signal.

The second calculation unit 150a is capable of making the judgment on whether the transmission path is a line-of-sight transmission path or an over-the-horizon transmission path by using a delay profile or the like.

After setting the second arrival direction reliance degree RE, the second calculation unit 150a transmits the second arrival direction reliance degree RE to the judgment unit 140a.

It is also possible for the second calculation unit 150a to calculate the second arrival direction reliance degree RE based on fluctuation in the transmission path between the communication device 100a and the communication device 200. For example, the second calculation unit 150a sets the second arrival direction reliance degree RE at a small value when the fluctuation in the transmission path is great. The second calculation unit 150a sets the second arrival direction reliance degree RE at a large value when the fluctuation in the transmission path is slight.

When the second arrival direction reliance degree RE exceeds a second threshold value TH2, the judgment unit 140a transmits the revision command C to the second calculation unit 150a so as to make the second arrival direction (angle θ') coincide with the first arrival direction (angle θ).

The second threshold value TH2 is a predetermined value. The second threshold value TH2 is stored in the volatile storage device 102 or the nonvolatile storage device 103.

The second threshold value TH2 may be determined in consideration of the standard variations due to the influence of the individual difference among a plurality of antennas, the installation error due to the installation of each of the plurality of antennas and the temperature change and the permissible range of the error of the second arrival direction (angle θ') calculated by the second calculation unit 150 including the error due to the calibration.

Next, a process executed by the communication device 100a will be described below with reference to a flowchart.

Figure 7:
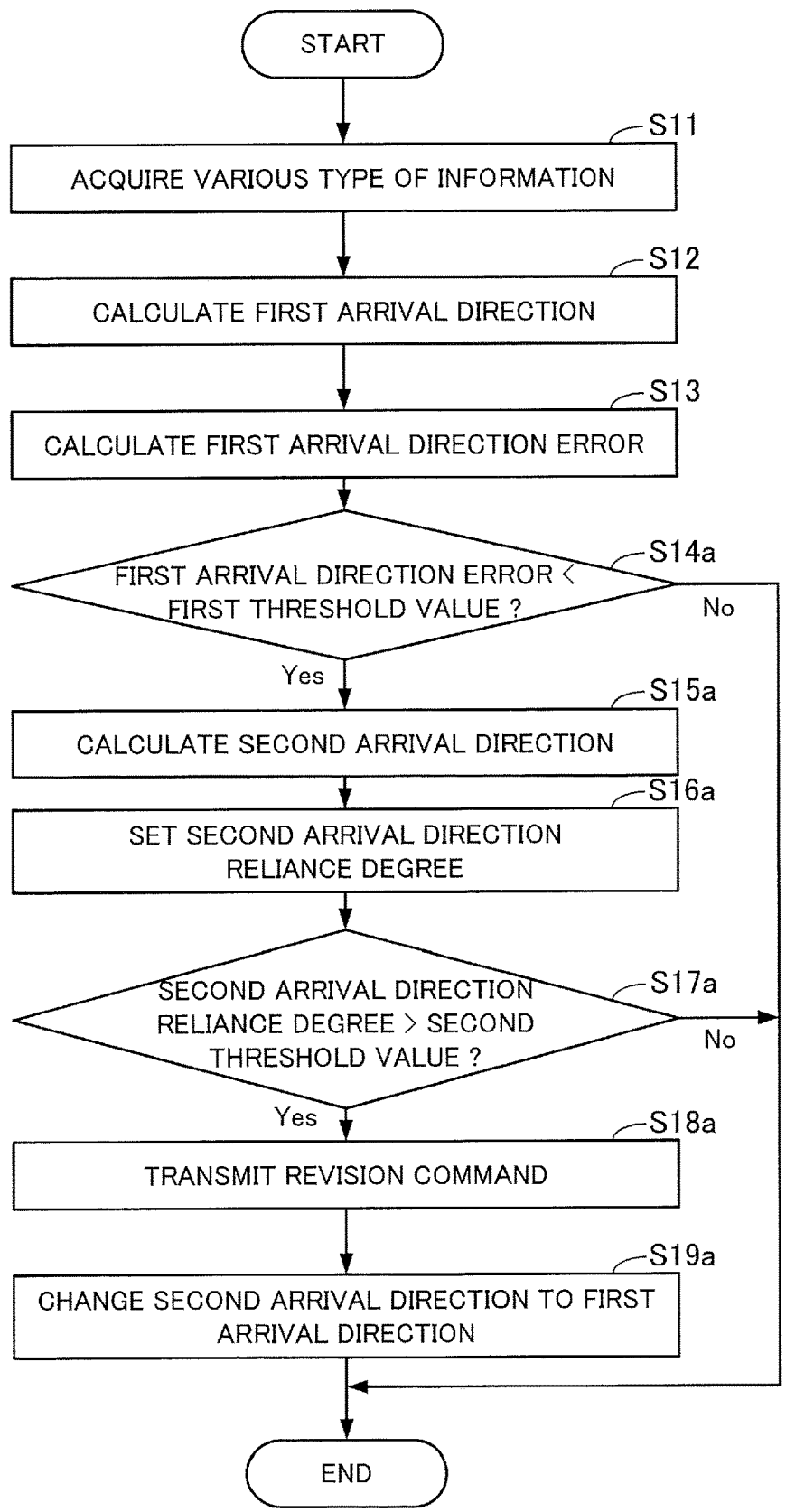
FIG. 7 is a flowchart showing a process executed by the communication device in the second embodiment.

FIG. 7 is a flowchart showing a process executed by the communication device in the second embodiment. The process shown in FIG. 7 differs from the process shown in FIG. 5 in that the communication device 100a executes steps S14a to S19a. Thus, in FIG. 7, only the steps S14a to S19a will be described below while omitting the description of the other steps by assigning the steps with the same step numbers as in FIG. 5.

(Step S14a) The judgment unit 140a judges whether or not the first arrival direction error (angle Δθ) is smaller than the first threshold value TH1. When the first arrival direction error (angle Δθ) is smaller than the first threshold value TH1

(Yes in the step S14a), the judgment unit 140a judges that the first arrival direction (angle θ) is an arrival direction of high accuracy. Then, the judgment unit 140a advances the process to step S15a.

When the first arrival direction error (angle Δθ) is larger than or equal to the first threshold value TH1 (No in the step S14a), the judgment unit 140a ends the process.

(Step S15a) The second calculation unit 150a calculates the second arrival direction (angle θ') based on a signal transmitted by the communication device 200.

(Step S16a) The second calculation unit 150a judges whether the transmission path is a line-of-sight transmission path or an over-the-horizon transmission path by using a delay profile or the like. When the transmission path is a line-of-sight transmission path, the second calculation unit 150a sets the second arrival direction reliance degree RE at a large value. When the transmission path is an over-the-horizon transmission path, the second calculation unit 150a sets the second arrival direction reliance degree RE at a small value.

The second calculation unit 150a transmits the second arrival direction reliance degree RE to the judgment unit 140a.

(Step S17a) The judgment unit 140a judges whether or not the second arrival direction reliance degree RE is higher than the second threshold value TH2. When the second arrival direction reliance degree RE is higher than the second threshold value TH2 (Yes in the step S17a), the judgment unit 140a advances the process to step S18a. When the second arrival direction reliance degree RE is less than or equal to the second threshold value TH2 (No in the step S17a), the judgment unit 140a ends the process.

(Step S18a) The judgment unit 140a transmits the revision command C to the second calculation unit 150a so as to make the second arrival direction (angle θ') coincide with the first arrival direction (angle θ).

(Step S19a) The second calculation unit 150a changes the second arrival direction (angle θ') to the first arrival direction (angle θ). Namely, the second calculation unit 150a makes the second arrival direction (angle θ') coincide with the first arrival direction (angle θ). The second calculation unit 150a outputs the second arrival direction (angle θ') after undergoing the change to coincide. Then, the second calculation unit 150a ends the process.

Since the second arrival direction (angle θ') includes the standard offset caused by incorrect calibration and the error corresponding to the variations in the measurement result as mentioned earlier, there is a possibility that the accuracy of the arrival direction is low even if the second arrival direction reliance degree RE is high. Thus, the communication device 100a makes the second arrival direction (angle θ') coincide with the first arrival direction (angle θ) when the accuracy of the first arrival direction (angle θ) is judged to be high even if the second arrival direction reliance degree RE is high. The communication device 100a is capable of making revision of high reliance degree by setting the second threshold value TH2 at a large value.

Incidentally, when the second arrival direction reliance degree RE is less than or equal to the second threshold value TH2 (No in the step S17a), the second calculation unit 150a does not need to output the second arrival direction (angle θ') calculated in the step S15a. This is because the accuracy of the arrival direction is regarded as considerably low.

According to the second embodiment, the communication device 100a executes the revision process of making the second arrival direction (angle θ') calculated by the second calculation unit 150a coincide with the first arrival direction (angle θ) of high accuracy. Accordingly, the communication device 100a is capable of revising the second arrival direction (angle θ') to an arrival direction of high accuracy.

Third Embodiment

Next, a third embodiment will be described below. In the third embodiment, the description will be given mainly of differences from the first embodiment and items common to the first embodiment will be left out.

In the first embodiment, the judgment unit 140 judges whether the second arrival direction (angle θ') should be revised or not by using the first arrival direction error (angle Δθ). In the third embodiment, a judgment unit 140b judges whether the second arrival direction (angle θ') should be revised or not by using a variation amount of the first arrival direction (angle θ) and a variation amount of the first arrival direction error (angle Δθ).

Figure 8:
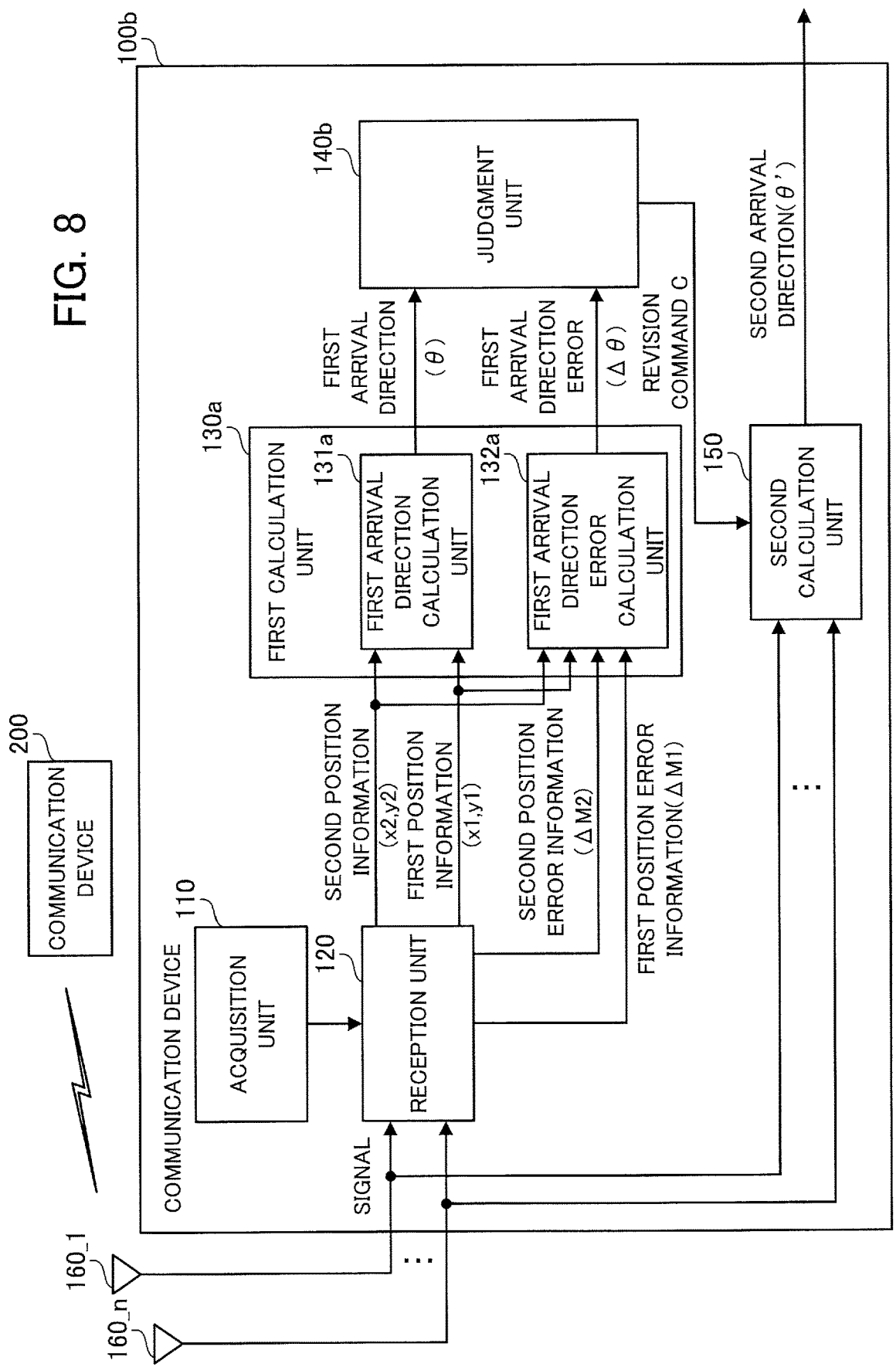
FIG. 8 is a functional block diagram showing a configuration of a communication device in a third embodiment.

FIG. 8 is a functional block diagram showing a configuration of a communication device in the third embodiment. The communication device 100b includes a first calculation unit 130a and the judgment unit 140b. The first calculation unit 130a includes a first arrival direction calculation unit 131a and a first arrival direction error calculation unit 132a. The communication device 100b differs from the communication device 100 in functions of the first arrival direction calculation unit 131a, the first arrival direction error calculation unit 132a and the judgment unit 140b. Each component in FIG. 8 identical or corresponding to a component shown in FIG. 1 is assigned the same reference character as in FIG. 1. FIG. 1 to FIG. 4 will be referred to in the third embodiment.

Every time the first arrival direction calculation unit 131a calculates the first arrival direction (angle θ), the first arrival direction calculation unit 131a stores the calculated first arrival direction (angle θ) in the volatile storage device 102 or the nonvolatile storage device 103. Specifically, every time the first arrival direction calculation unit 131a calculates the first arrival direction, the first arrival direction calculation unit 131a stores the angle θ corresponding to the calculated first arrival direction (angle θ) in the volatile storage device 102 or the nonvolatile storage device 103. Thus, the volatile storage device 102 or the nonvolatile storage device 103 stores the angles θ corresponding to the first arrival directions (angles θ) calculated previously and differing in the time.

Every time the first arrival direction error calculation unit 132a calculates the first arrival direction error (angle Δθ), the first arrival direction error calculation unit 132a stores the calculated first arrival direction error (angle Δθ) in the volatile storage device 102 or the nonvolatile storage device 103. Thus, the volatile storage device 102 or the nonvolatile storage device 103 stores the first arrival direction errors (angles Δθ) calculated previously and differing in the time.

Next, a process executed by the communication device 100b will be described below with reference to a flowchart.

Figure 9:
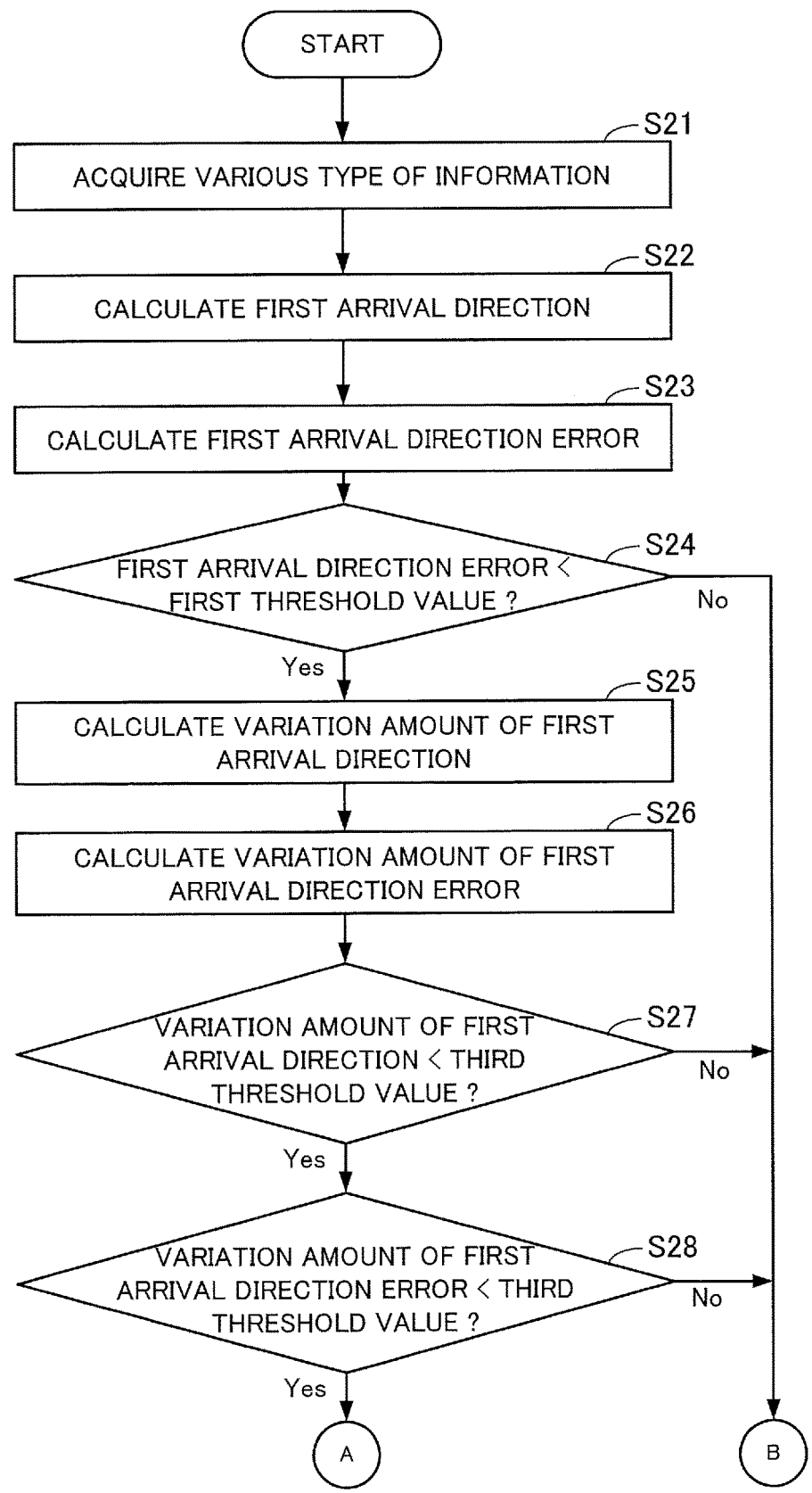
FIG. 9 is a flowchart (part 1) showing a process executed by the communication device in the third embodiment.

FIG. 9 is a flowchart (part 1) showing a process executed by the communication device in the third embodiment.

(Step S21) The reception unit 120 receives the first position information (x1, y1) and the first position error information (value ΔM1) from the acquisition unit 110. The reception unit 120 receives a signal transmitted by the communication device 200 via the antenna elements 160_1 to 160_n. The reception unit 120 demodulates the received signal. The reception unit 120 acquires the second position and the second position error information (value ΔM2) by demodulating the signal.

(Step S22) The first arrival direction calculation unit 131*a* calculates $\theta_2$ by using the expression (1). The first arrival direction calculation unit 131*a* calculates $\theta$ by using the expression (2).

The first arrival direction calculation unit 131*a* determines the first arrival direction (angle $\theta$) as the direction of the angle $\theta$ with reference to the direction of the communication device 100*b*. As above, the first arrival direction calculation unit 131*a* calculates the first arrival direction (angle $\theta$) by using the expression (1) and the expression (2).

The first arrival direction calculation unit 131*a* stores the angle $\theta$ corresponding to the first arrival direction (angle $\theta$) calculated by using the expression (2) in the volatile storage device 102 or the nonvolatile storage device 103.

(Step S23) The first arrival direction error calculation unit 132*a* calculates the first arrival direction error (angle $\Delta\theta$) by using the expression (3).

The first arrival direction error calculation unit 132*a* stores the first arrival direction error (angle $\Delta\theta$) in the volatile storage device 102 or the nonvolatile storage device 103.

(Step S24) The judgment unit 140*b* judges whether or not the first arrival direction error (angle $\Delta\theta$) calculated in the step S23 is smaller than the first threshold value TH1. When the first arrival direction error (angle $\Delta\theta$) is smaller than the first threshold value TH1 (Yes in the step S24), the judgment unit 140*b* judges that the first arrival direction (angle $\theta$) calculated in the step S22 is an arrival direction of high accuracy. Then, the judgment unit 140*b* advances the process to step S25.

When the first arrival direction error (angle $\Delta\theta$) is larger than or equal to the first threshold value TH1 (No in the step S24), the judgment unit 140*b* advances the process to step S32.

(Step S25) The first arrival direction calculation unit 131*a* calculates the variation amount of the first arrival direction (angle $\theta$). Specifically, the first arrival direction calculation unit 131*a* calculates the variation amount of the first arrival direction (angle $\theta$) as the magnitude of the variation of the angles $\theta$ corresponding to a plurality of first arrival directions (angles $\theta$) calculated in a period from the time of the calculation of the first arrival direction (angle $\theta$) in the step S22 to a time that is a prescribed time earlier than the time of the calculation and stored in the volatile storage device 102 or the nonvolatile storage device 103. The first arrival direction calculation unit 131*a* calculates the magnitude of the variation of the plurality of first arrival directions (angles $\theta$) by using the standard deviation. For example, the first arrival direction calculation unit 131*a* integrates the square of the difference between the mean value of the plurality of first arrival directions (angles $\theta$) and each of the plurality of first arrival directions (angles $\theta$).

It is also possible for the first arrival direction calculation unit 131*a* to calculate the variation amount of the first arrival direction (angle $\theta$) as follows: Among the data stored in the volatile storage device 102 or the nonvolatile storage device 103, the first arrival direction calculation unit 131*a* identifies a plurality of first arrival directions (angles $\theta$) calculated in a period from the time of the calculation of the first arrival direction (angle $\theta$) in the step S22 to a time that is a prescribed time earlier than the time of the calculation. The first arrival direction calculation unit 131*a* selects two first arrival directions (angles $\theta$) from the plurality of first arrival directions (angles $\theta$). The first arrival direction calculation unit 131*a* determines a combination of selected two first arrival directions (angles $\theta$) that maximizes the difference between two first arrival directions (angles $\theta$). The first arrival direction calculation unit 131*a* calculates the difference between the two first arrival directions (angles $\theta$) of the determined combination as the variation amount of the first arrival direction (angle $\theta$).

(Step S26) The first arrival direction error calculation unit 132*a* calculates the variation amount of the first arrival direction error (angle $\Delta\theta$). Specifically, the first arrival direction error calculation unit 132*a* calculates the variation amount of the first arrival direction error (angle $\Delta\theta$) as the magnitude of the variation of a plurality of first arrival direction errors (angles $\Delta\theta$) calculated in a period from the time of the calculation of the first arrival direction error (angle $\Delta\theta$) in the step S23 to a time that is a prescribed time earlier than the time of the calculation and stored in the volatile storage device 102 or the nonvolatile storage device 103. The first arrival direction error calculation unit 132*a* calculates the magnitude of the variation of the plurality of first arrival direction errors (angles $\Delta\theta$) by using the standard deviation. For example, the first arrival direction error calculation unit 132*a* integrates the square of the difference between the mean value of the plurality of first arrival direction errors (angles $\Delta\theta$) and each of the plurality of first arrival direction errors (angles $\Delta\theta$).

It is also possible for the first arrival direction error calculation unit 132*a* to calculate the variation amount of the first arrival direction error (angle $\Delta\theta$) as follows: Among the data stored in the volatile storage device 102 or the nonvolatile storage device 103, the first arrival direction error calculation unit 132*a* identifies a plurality of first arrival direction errors (angles $\Delta\theta$) calculated in a period from the time of the calculation of the first arrival direction error (angle $\Delta\theta$) in the step S23 to a time that is a prescribed time earlier than the time of the calculation. The first arrival direction error calculation unit 132*a* selects two first arrival direction errors (angles $\Delta\theta$) from the plurality of first arrival direction errors (angles $\Delta\theta$), and determines a combination of two first arrival direction errors (angles $\Delta\theta$) that maximizes the difference between two first arrival direction errors (angles $\Delta\theta$). The first arrival direction error calculation unit 132*a* calculates the difference between the two first arrival direction errors (angles $\Delta\theta$) of the determined combination as the variation amount of the first arrival direction error (angle $\Delta\theta$).

(Step S27) The judgment unit 140*b* judges whether or not the variation amount of the first arrival direction (angle $\theta$) is smaller than a third threshold value TH3. When the variation amount of the first arrival direction (angle $\theta$) is smaller than the third threshold value TH3 (Yes in the step S27), the judgment unit 140*b* advances the process to step S28. When the variation amount of the first arrival direction (angle $\theta$) is larger than or equal to the third threshold value TH3 (No in the step S27), the judgment unit 140*b* advances the process to the step S32.

(Step S28) The judgment unit 140*b* judges whether or not the variation amount of the first arrival direction error (angle $\Delta\theta$) is smaller than the third threshold value TH3. When the variation amount of the first arrival direction error (angle $\Delta\theta$) is smaller than the third threshold value TH3 (Yes in the step S28), the judgment unit 140*b* advances the process to step S31. When the variation amount of the first arrival direction error (angle $\Delta\theta$) is larger than or equal to the third threshold value TH3 (No in the step S28), the judgment unit 140*b* advances the process to the step S32.

Figure 10:
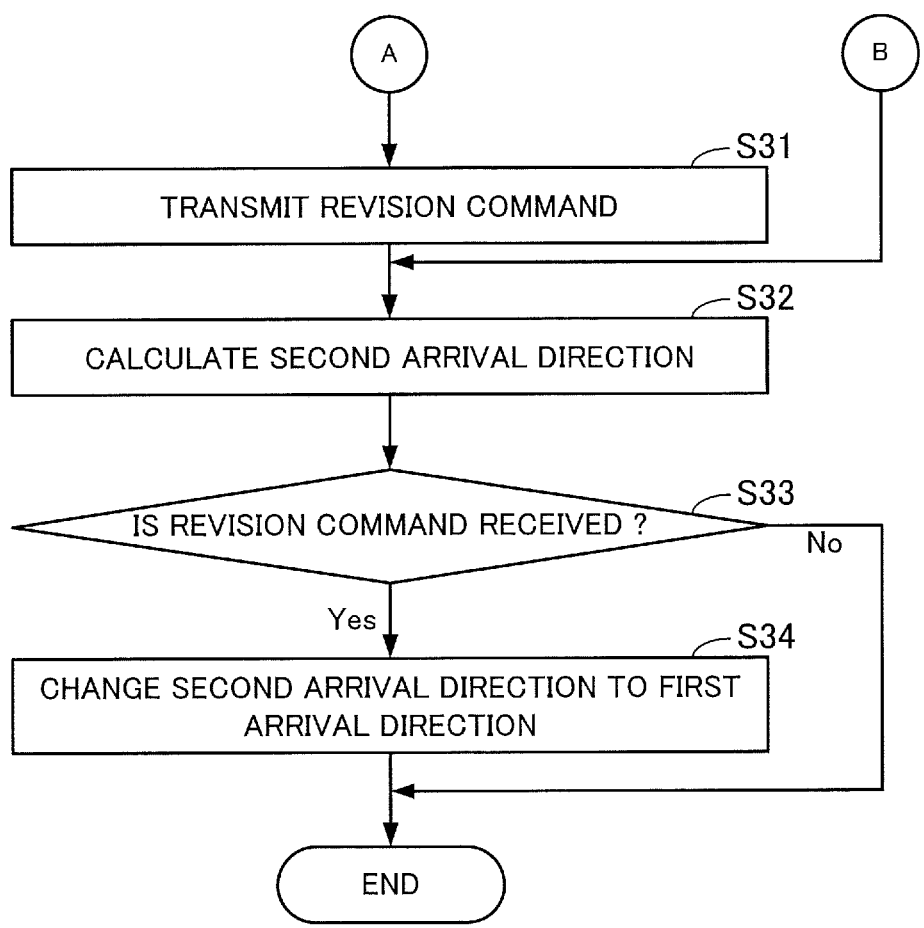
FIG. 10 is a flowchart (part 2) showing the process executed by the communication device in the third embodiment.

FIG. 10 is a flowchart (part 2) showing the process executed by the communication device in the third embodiment.

(Step S31) The judgment unit 140b transmits the revision command C to the second calculation unit 150 so as to make the second arrival direction (angle θ') coincide with the first arrival direction (angle θ).

(Step S32) The second calculation unit 150 calculates the second arrival direction (angle θ') based on a signal transmitted by the communication device 200.

(Step S33) The second calculation unit 150 judges whether or not the revision command C is received. When the revision command C is received (Yes in the step S33), the second calculation unit 150 *advances the process to step S34*.

When the revision command C is not received (No in the step S33), the second calculation unit 150 outputs the second arrival direction (angle θ'). Then, the second calculation unit 150 ends the process.

(Step S34) The second calculation unit 150 changes the second arrival direction (angle θ') calculated in the step S32 to the first arrival direction (angle θ). Namely, the second calculation unit 150 makes the second arrival direction (angle θ') calculated in the step S32 coincide with the first arrival direction (angle θ). The second calculation unit 150 outputs the second arrival direction (angle θ') after undergoing the change to coincide. Then, the second calculation unit 150 ends the process.

The third threshold value TH3 is a predetermined value. The third threshold value TH3 is stored in the volatile storage device 102 or the nonvolatile storage device 103.

The third threshold value TH3 may be determined in consideration of the standard variations due to the influence of the individual difference among a plurality of antennas, the installation error due to the installation of each of the plurality of antennas and the temperature change and the permissible range of the error of the second arrival direction (angle θ') calculated by the second calculation unit 150 including the error due to the calibration. The communication device 100b is capable of making revision to an arrival direction of high reliance degree by setting the third threshold value TH3 at a small value.

The judgment unit 140b made the judgments in the step S27 and the step S28 by using the third threshold value TH3. However, the judgment unit 140b may also make the judgments in the step S27 and the step S28 by using different threshold values. For example, the judgment unit 140b makes the judgment in the step S27 by using the third threshold value TH3. The judgment unit 140b makes the judgment in the step S28 by using a fourth threshold value TH4. Then, when the variation amount of the first arrival direction error (angle Δθ) is smaller than the fourth threshold value TH4, the judgment unit 140b advances the process to the step S31. When the variation amount of the first arrival direction error (angle Δθ) is larger than or equal to the fourth threshold value TH4, the judgment unit 140b advances the process to the step S32.

Incidentally, the fourth threshold value TH4 is a predetermined value. The fourth threshold value TH4 is stored in the volatile storage device 102 or the nonvolatile storage device 103.

The communication device 100b makes the second arrival direction (angle θ') coincide with the first arrival direction (angle θ) of high accuracy when the accuracy of the first arrival direction (angle θ) is judged to be high and the variation amount of the first arrival direction (angle θ) and the variation amount of the first arrival direction error (angle Δθ) are smaller than the threshold value. Accordingly, the communication device 100b is capable of revising the second arrival direction (angle θ') to an arrival direction of high accuracy.

Features in the embodiments described above can be appropriately combined with each other.

DESCRIPTION OF REFERENCE CHARACTERS 100, 100a, 100b: communication device, 110: acquisition unit, 120: reception unit, 130, 130a: first calculation unit, 131, 131a: first arrival direction calculation unit, 132, 132a: first arrival direction error calculation unit, 140, 140a, 140b: judgment unit, 150, 150a: second calculation unit, 160: antenna element, 200: communication device

What is claimed is:

1. A communication device that receives a signal provided from a positioning system and communicates with a first communication device, the communication device comprising:
    an acquisition unit to acquire first position information indicating a first position of the communication device and first position error information indicating an error of the first position based on a signal provided from the positioning system;
    a reception unit to receive second position information indicating a second position of the first communication device and second position error information indicating an error of the second position acquired by the first communication device based on a signal provided from the positioning system;
    a first calculation unit to calculate a first arrival direction as a direction toward the first communication device from the communication device and a first arrival direction error indicating an error of the first arrival direction based on one or more pieces of information out of the first position information, the first position error information, the second position information and the second position error information;
    a second calculation unit to calculate a second arrival direction as a direction toward the first communication device from the communication device based on a signal transmitted from the first communication device and to set a reliance value of the second arrival direction based on a transmission path between the communication device and the first communication device; and
    a judgment unit to make the second calculation unit revise the second arrival direction based on the first arrival direction when the first arrival direction error is smaller than a first threshold value and the reliance value is higher than a second threshold value.

2. The communication device according to claim 1, wherein the judgment unit makes the second calculation unit revise the second arrival direction so as to bring the second arrival direction close to the first arrival direction.

3. The communication device according to claim 1, wherein the judgment unit makes the second calculation unit revise the second arrival direction so as to make the second arrival direction coincide with the first arrival direction.

4. The communication device according to claim 1, wherein the first calculation unit calculates the first arrival direction based on the first position information and the second position information and calculates the first arrival direction error based on the first position information, the first position error information, the second position information and the second position error information.

5. The communication device according to claim 4, wherein the first calculation unit calculates the first arrival direction error based on a distance between the first position and the second position, the first position error information and the second position error information.

6. The communication device according to claim 1, wherein
the first calculation unit calculates a variation amount of the first arrival direction based on a plurality of first arrival directions calculated previously and calculates a variation amount of the first arrival direction error based on a plurality of first arrival direction errors calculated previously, and
the judgment unit makes the second calculation unit revise the second arrival direction based on the first arrival direction when the first arrival direction error is smaller than the first threshold value and both of the variation amount of the first arrival direction and the variation amount of the first arrival direction error are smaller than a predetermined third threshold value.

7. The communication device according to claim 1, wherein
the first calculation unit calculates a variation amount of the first arrival direction based on a plurality of first arrival directions calculated previously and calculates a variation amount of the first arrival direction error based on a plurality of first arrival direction errors calculated previously, and
the judgment unit makes the second calculation unit revise the second arrival direction based on the first arrival direction when the first arrival direction error is smaller than the first threshold value, the variation amount of the first arrival direction is smaller than a predetermined. third threshold value, and the variation amount of the first arrival direction error is smaller than a predetermined fourth threshold value.

8. A control method performed by a communication device receiving a signal provided from a positioning system and communicating with a first communication device, the control method comprising:
acquiring first position information indicating a first position of the communication device and first position error information indicating an error of the first position based on a signal provided from the positioning system and receiving second position information indicating a second position of the first communication device and second position error information indicating an error of the second position acquired by the first communication device based on a signal provided from the positioning system;
calculating a first arrival direction as a direction toward the first communication device from the communication device and a first arrival direction error indicating an error of the first arrival direction based on one or more pieces of information out of the first position information, the first position error information, the second position information and the second position error information and calculating a second arrival direction as a direction toward the first communication device from the communication device based on a signal transmitted from the first communication device;
setting a reliance value of the second arrival direction based on a transmission path between the communication device and the first communication device; and
revising the second arrival direction based on the first arrival direction when the first arrival direction error is smaller than a first threshold value and the reliance value is higher than a second threshold value.

9. A communication device that receives a signal provided from a positioning system and communicates with a first communication device, the communication device comprising:
a processor to execute a program; and
a memory to store the program which, when executed by the processor, performs
acquiring first position information indicating a first position of the communication device and first position error information indicating an error of the first position based on a signal provided from the positioning system and receiving second position information indicating a second position of the first communication device and second position error information indicating an error of the second position acquired by the first communication device based on a signal provided from the positioning system;
calculating a first arrival direction as a direction toward the first communication device from the communication device and a first arrival direction error indicating an error of the first arrival direction based on one or more pieces of information out of the first position information, the first position error information, the second position information and the second position error information and calculating a second arrival direction as a direction toward the first communication device from the communication device based on a signal transmitted from the first communication device;
setting a reliance value of the second arrival direction based on a transmission path between the communication device and the first communication device; and
revising the second arrival direction based on the first arrival direction when the first arrival direction error is smaller than a first threshold value and the reliance value is higher than a second threshold value.

* * * * *